United States Patent [19]
de Montgolfier et al.

[11] 4,361,766
[45] Nov. 30, 1982

[54] REMOTELY-CONTROLLABLE RELAYS

[75] Inventors: Arnaud de Montgolfier, St. Julien l'Ars; Marc Laprie, Jaunay Clan, both of France

[73] Assignee: Enertec, Montrouge, France

[21] Appl. No.: 197,047

[22] Filed: Oct. 15, 1980

[30] Foreign Application Priority Data

Oct. 24, 1979 [FR] France ................................ 79 26366

[51] Int. Cl.³ .............................................. H04Q 9/00
[52] U.S. Cl. ........................................... 307/3; 307/40; 340/310 A; 364/492
[58] Field of Search ................... 307/3, 4, 38, 39, 40, 307/41, 141, 141.4; 328/134; 340/310 R, 310 A; 361/171, 172, 195; 364/492, 493

[56] References Cited

U.S. PATENT DOCUMENTS

4,264,960  4/1981  Gurr ................................. 307/40 X

FOREIGN PATENT DOCUMENTS

2404326  4/1979  France .
568671  10/1975  Switzerland .

Primary Examiner—G. Z. Rubinson
Assistant Examiner—James L. Dwyer
Attorney, Agent, or Firm—Dale Gaudier

[57] ABSTRACT

A ripple control relay is arranged (i) to delay implementation of a received command until the end of a predetermined time interval following reception of the command; (ii) to delay implementation as in (i), and to implement the complementary command automatically after a further predetermined interval; or (iii) to repeat the sequence as in (ii) cyclically.

10 Claims, 9 Drawing Figures

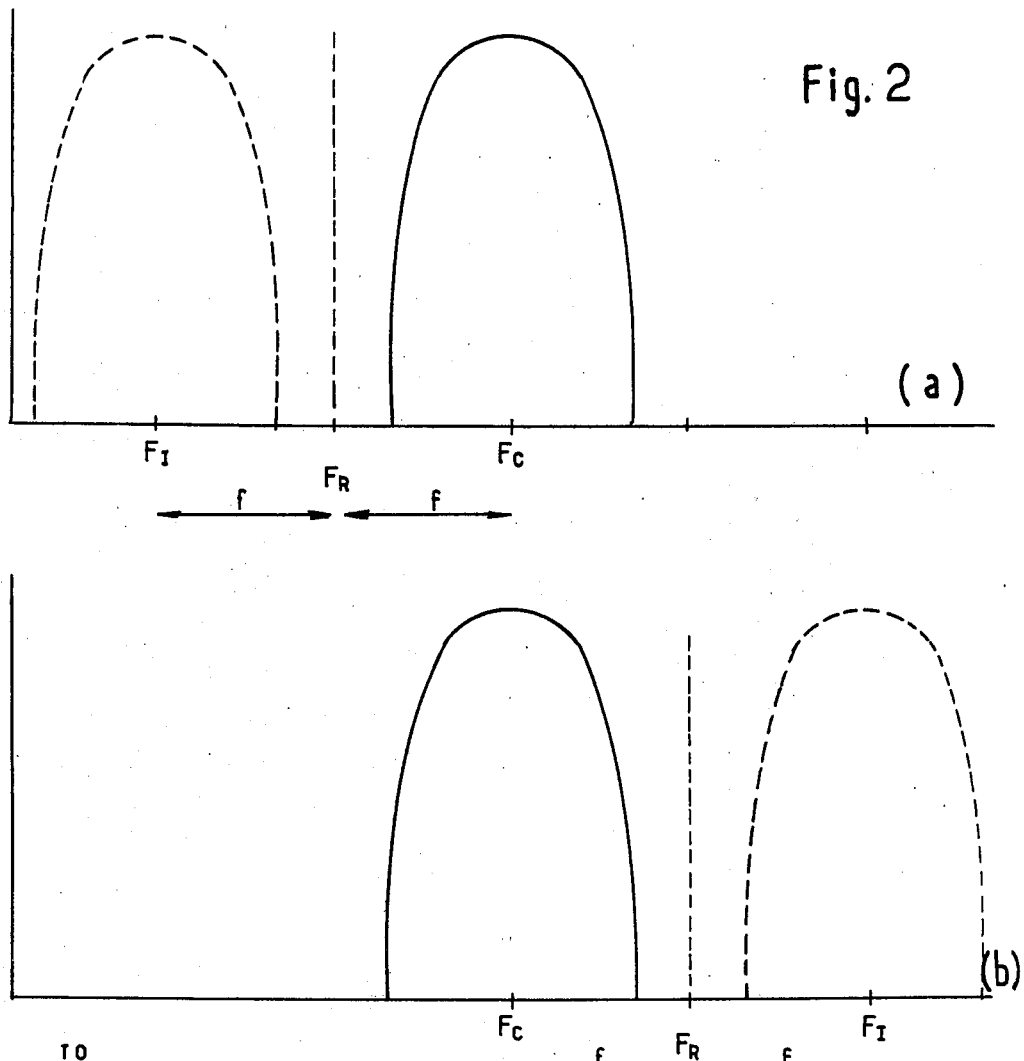
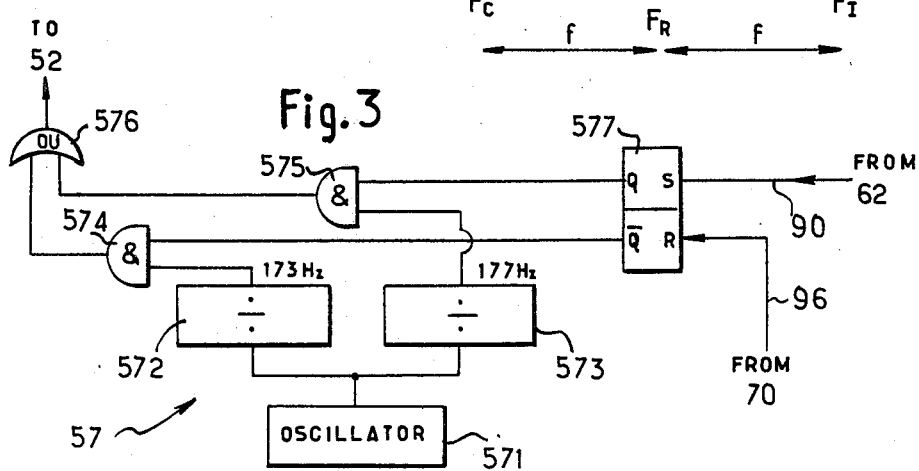

Fig.5

| RAM ||
| ADDRESS | CONTENTS |
| --- | --- |
| ⋮ | |
| X | COUNT |
| Y | NEXT Z |
| ⋮ | |
| 43 | 0 ---------- 0 |
| 44 | 1 ---------- 0 |
| 45 | 1 ---------- 1 |
| 46 | 1 ---------- 1 |
| 47 | 1 ---------- 0 |
| 48 | 0 ---------- 0 |
| ⋮ | |

Z = { 43 ... 48 }

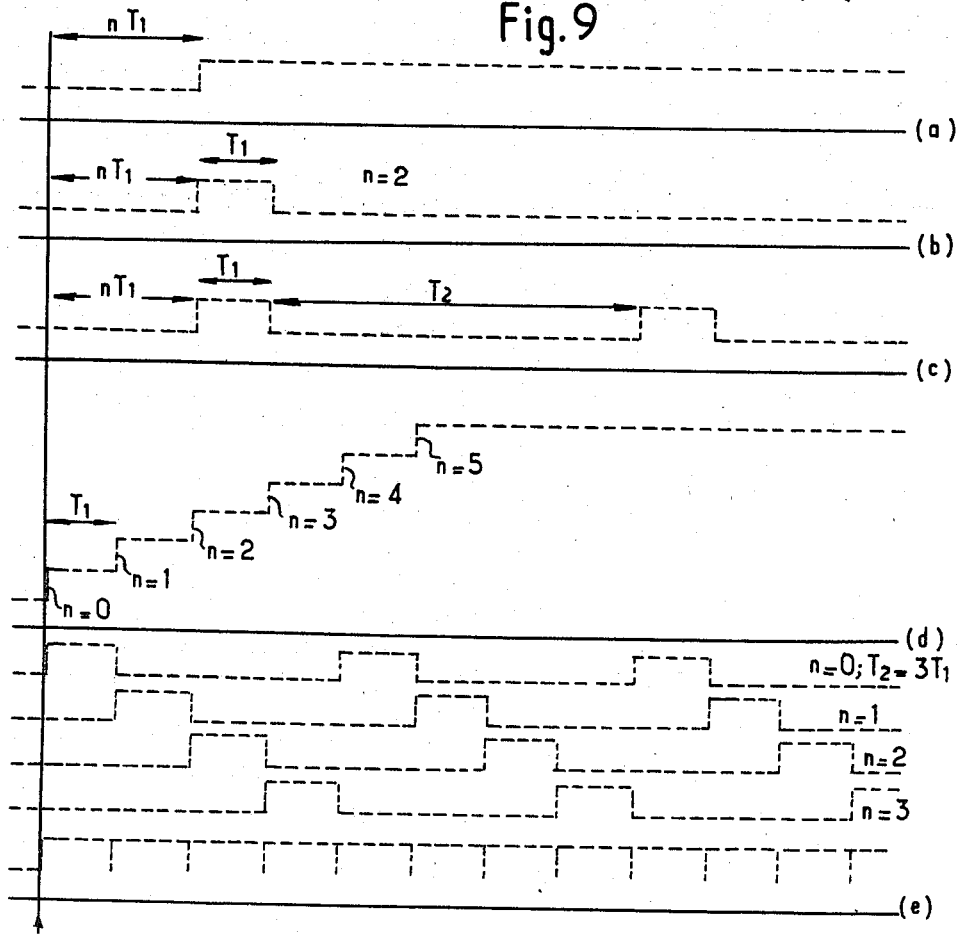

REMOTELY-CONTROLLABLE RELAYS

TECHNICAL FIELD

This invention relates to remotely-controllable relays for effecting an operation in response to a control signal in the form of an alternating ripple voltage superimposed upon an alternating power supply voltage in an electric-power distribution network.

BACKGROUND ART

In known remotely-controllable relays, such as that described for example in U.S. Pat. No. 4,232,298, the desired operation is effected immediately upon receipt of the ripple voltage control signal.

DISCLOSURE OF INVENTION

According to one aspect of this invention there is provided a remotely-controllable relay for effecting an operation in response to a control signal in the form of an alternating ripple voltage superimposed upon an alternating power supply voltage in an electric-power distribution network, characterised in that the relay is arranged to delay implementation of the operation for a predetermined period of time after receipt of said control signal.

With such a relay, it is possible to arrange for different groups of relays to effect the operation after different delays. Thus, if the operation is, for example, the energisation of a street lamp, the overall increase in load on the power distribution network can be made progressive.

Furthermore, the relay can be arranged to implement the inverse of said operation after a further predetermined period of time, whereupon the different groups of relays can be made to effect the operation at different times, thereby limiting the total increase in load.

BRIEF DESCRIPTION OF DRAWINGS

A remotely-controllable relay in accordance with this invention will now be described, by way of example, with reference to the accompanying drawings, in which:

FIG. 2 shows two frequency response curves which are illustrative of the operation of the relay;

FIG. 3 is a circuit diagram of a pulse generator in one form of the relay of FIG. 1;

FIG. 5 is a map of part of the memory of such a microprocessor;

FIG. 7 is a map of another part of the memory of the microprocessor;

FIG. 8 shows a status register associated with the microprocessor; and

FIG. 9 is a timing diagram illustrating different modes of operation of the other form of the relay.

BEST MODE FOR CARRYING OUT THE INVENTION/INDUSTRIAL APPLICABILITY

Figure 1:
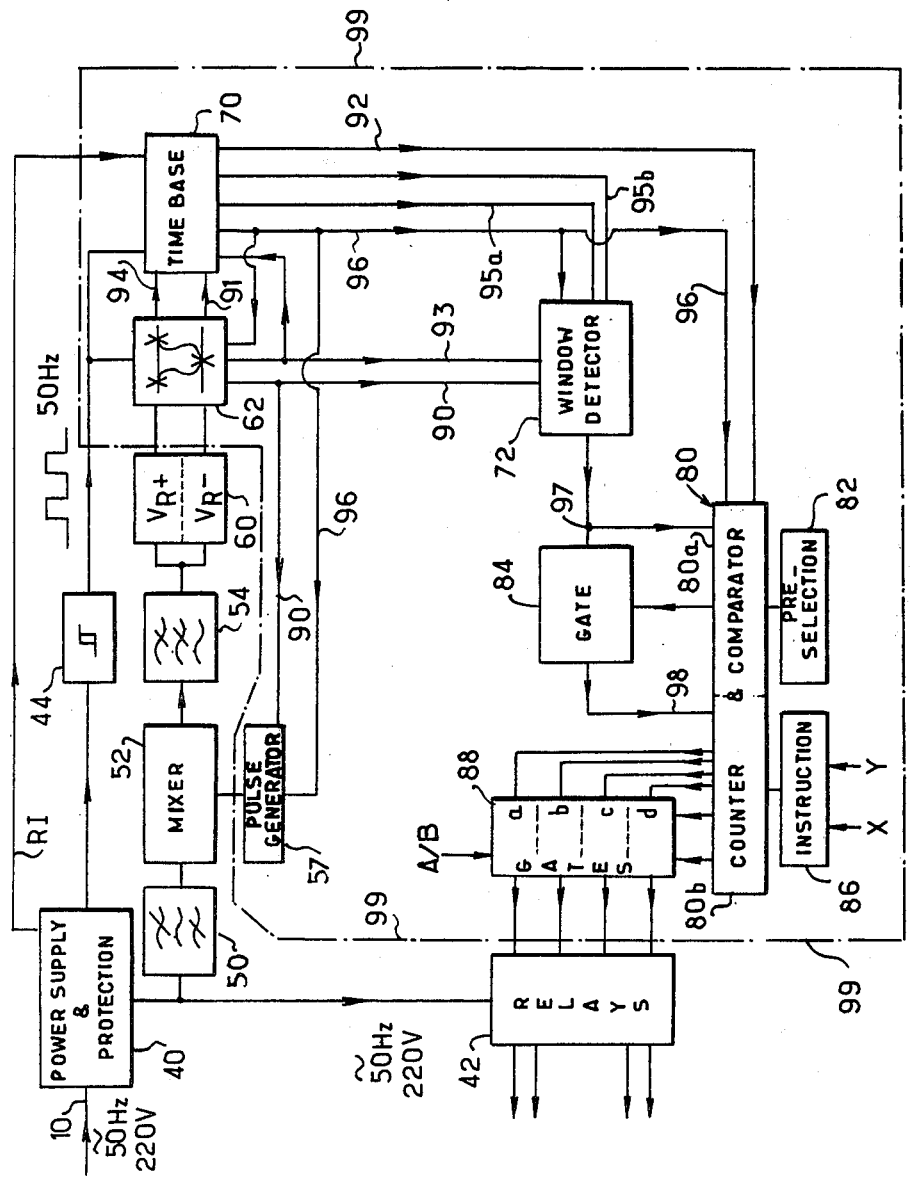
FIG. 1 is a block schematic diagram illustrating the principles of operation of the relay.

The relay shown in FIG. 1 is in most respects extensively described in U.S. Pat. No. 4,232,298 and therefore need only be described briefly herein.

Referring to FIG. 1, an input terminal 10 of a power supply and protection unit 40 is coupled to receive the network voltage of an electric-power distribution network, within which instructions are transmitted by ripple voltage pulses which are superimposed on the mains supply voltage and which are to be detected and implemented, as appropriate, by the relay. The unit 40 filters the network voltage to block over-voltages and transients, and generates the energizing voltages for the rest of the relay. In particular, this unit 40 provides an a.c. supply at 220 v for relay units in a relay circuit 42, and a low voltage 50 Hz (nominal) signal to a trigger circuit 44 which derives therefrom a clock signal at the frequency of the mains supply.

The 220 v supply for the relay circuit 42 (being essentially the mains supply filtered as described above to protect the circuit) is also coupled to a bandpass filter 50 forming the input to the circuitry for extracting and detecting the 175 Hz ripple signal. The band-pass filter 50 attenuates, relative to signals at the 175 Hz ripple frequency, both the 50 Hz mains supply and its high-order, odd (particularly 11th and 13th) harmonics.

The circuitry for extracting the ripple signal comprises a mixer 52 and a low-pass filter 54. The mixer 52 (for example, a simple MOS switch used as a chopper) is responsive to pulses supplied by a pulse generator 57 to mix the signal from the band-pass filter 50 with a reference signal at a frequency close, but not equal, to 175 Hz. The output spectrum of the mixer 52 includes a beat signal at the difference frequency between the reference signal frequency and the ripple frequency, corresponding to the ripple voltage signal down-shifted to a very low frequency ($1\frac{1}{2}$ to $2\frac{1}{2}$ Hz). The low-pass filter 54 is tuned to pass this very low frequency, and to exclude higher frequencies, including the power supply frequency, the ripple voltage frequency and the reference signal frequency.

The output signal of the low-pass filter 54, comprising a $1\frac{1}{2}$–$2\frac{1}{2}$ Hz oscillation occurring as and when there is 175 Hz ripple on the mains supply waveform, is passed to a dual comparator 60 and a sequence gate 62 which together perform a magnitude-monitoring and crossing detection function to sense the presence of the $1\frac{1}{2}$–$2\frac{1}{2}$ Hz oscillation.

Upon detection of 175 Hz ripple of duration sufficient to constitute either a starting pulse at the beginning of a train of ripple pulses, or a control-signal pulse within such a train, a detection signal is supplied by the sequence gate 62 on a line 90 to a window detector 72. In addition, for a starting pulse (that is, when the circuit is quiescent), the sequence gate 62 supplies a trigger signal on a line 91 to a timebase circuit 70. The sequence gate 62 also supplies a signal on a line 93 whenever any signal of sufficient magnitude to constitute a ripple-derived signal is present at the output of the low-pass filter 54, and a signal on a line 94 if a pulse which causes the supply of a trigger signal on the line 91 does not thereafter fulfil all the requirements for a valid starting pulse.

The timebase circuit 70, after being triggered, supplies timebase pulses on a line 92 to mark the expected time of occurrence of each possible control-signal pulse in the train of pulses superimposed on the 50 Hz mains supply, and co-ordinates the operation of a counter and comparator 80 coupled to the line 92. However, if the circuit 70 receives a signal via the line 94, its operation is immediately arrested, and the relay is reset to the quiescent condition.

At the start of each timebase pulse, the timebase circuit 70 also supplies a command window-pulse on a line 95a and, later, a check window-pulse on a line 95b. These pulses are received by the window detector 72 which responds by accepting any detection signal on the line 90 occurring during a command window-pulse, and subsequently generating a corresponding enabling pulse on a line 97 provided that no ripple (as indicated by a signal on the line 93) is present during the following check window-pulse. The line 93 is also coupled to the timebase circuit 70 which arrests its own operation if a signal occurs on this line 93 while the circuit 70 is generating the first check window-pulse. These various checks are provided to safeguard the relay against erroneous operation in response to transients and spurious 175 Hz signals.

The timebase pulses on the line 92 are counted by a first stage 80a of the counter and comparator circuit 80 which compares the count with a number pre-set in a pre-selection store 82. If an enabling pulse is present on the line 97 when the count equals the preset number, a gate 84 is opened by the stage 80a to transfer subsequent enabling pulses via a line 98 to a second stage 80b. This stage 80b counts groups of five timebase pulses and compares the group count with two numbers X and Y in another store 86 to determine whether each enabling pulse is intended to operate that particular relay. Thus, when the group count equals the number X, the stage 80b couples the line 98 to two gates 88a and 88b so that any enabling pulses occurring during that group of timebase pulses are fed to those gates 88a and 88b. Similarly, the line 98 is coupled to two more gates 88c and 88d when the group count equals Y. The gates 88a and 88d are opened successively during each group of timebase pulses to steer any enabling pulses to either open or close one or both relay units in the relay circuit 42, depending on the timing of the enabling pulse and a signal on an input A/B to the gates 88.

A signal to reset the sequence gate 62, the window detector 72 and the counter and comparator circuit 80 is supplied by the timebase circuit 70 on a line 96 when power is applied or re-applied to the relay (in response to a signal RI from the unit 40); when the relay has counted forty control-signal time-slots after a starting pulse; or when the operation of the timebase circuit 70 is arrested prematurely as described earlier.

With the exception of the pulse generator 57, the detailed circuitry of the units shown in FIG. 1 is to be found in the aforementioned U.S. Patent. Although FIG. 1 has been drawn and described in terms of individual, separate blocks of circuitry, it should be noted that the functions of the circuits within the dashed outline 99 can be performed by means of a suitably-programmed microprocessor, in which case more relay units can be included in the relay circuit 42 and the modes of implementation of control signals by the relay can be considerably expanded, as will be described hereinafter. In this connection, there is described in French Patent Application No. 79 03 357 a version of the mixer 52 and the pulse generator 57 in which a microprocessor embraces the function of the pulse generator 57.

In both of the above-identified disclosures, the constant frequency of the reference signal has a single pre-determined value at all times. Consequently, the frequency response of, for example, the mixer 52 and the low-pass filter 54 of the later of those disclosures, relative to the ripple signal, is as shown in FIG. 2(a).

Referring to FIG. 2(a), the primary response is a steep-sided lobe centred on the frequency $F_C$ of the control-signal ripple, and falling to zero at the frequency $F_R$ of the reference signal. However, there is a second mirror-image lobe centred at a frequency $F_I$, where $$F_R - F_I = F_C - F_R = f$$

Thus, it is possible that the relay will respond to noise or other spurious signals at a frequency in the vicinity of $F_I$ as if they were valid control signals at the ripple frequency $F_R$.

In order to avoid the possibility of such erroneous operation the pulse generator 57 is arranged as shown in FIG. 3.

Referring to FIG. 3, the pulse generator 57 has an oscillator 571 which feeds two dividers 572 and 573. These dividers 572 and 573 divide down the signal from the oscillator 571 to produce output signals at 173 Hz and 177 Hz respectively, these signals being supplied to respective AND-gates 574 and 575. The AND-gates 574 and 575 are in turn coupled via an OR-gate 576 to the mixer 52. A bistable circuit 577 has its Q output coupled to enable the AND-gate 575 and its Q output coupled to enable the AND-gate 574. The bistable circuit is set by any detection signal on the line 90, and reset by the reset signals on the line 96.

During quiescent operation, when no control-signal pulse-train is being received, the bistable circuit is in its reset state, thereby enabling the AND-gate 574, so the mixer 52 receives the 173 Hz reference signal from the divider 572. The frequency response is as already described, and as shown in FIG. 2(a). However, when a starting pulse is received, a detection pulse appears on the line 90, setting the bistable circuit 577. Thereupon, the AND-gate 574 is disabled and the AND-gate 575 is enabled, changing the reference signal frequency from 173 Hz to 177 Hz. Consequently, the frequency response changes from that in FIG. 2(a) to that in FIG. 2(b). One lobe of the response remains centred on the ripple frequency $F_c$, but the image frequency $F_I$ has now shifted from $F_C-2f$ to $F_C+2f$. The reference signal frequency $F_R$ remains at 177 Hz until the end of the control-signal pulse-train, when a reset signal appears on the line 96, resetting the bistable circuit 577 and returning the reference signal frequency to 173 Hz.

Thus, any spurious signals at or near 171 Hz ($F_I$ in FIG. 2(a)) can only initiate a cycle of operation of the relay, since the frequency response changes to that shown in FIG. 2(b), rendering the relay insensitive to further signals at 171 Hz. The relay thereafter merely counts 40 timebase pulses and reverts to quiescent operation, without changing the state of the relay units 42 (since such change would require the reception of a control-signal pulse during one of the timebase pulses). Equally, a spurious signal at about 179 Hz ($F_I$ in FIG. 2(b)) cannot even initiate a cycle of operation, since its frequency is outside the range of response of the relay during quiescent operation (FIG. 2(a)). However, any proper control signal at 175 Hz can always operate the relay, since it always falls within the range of response of the relay (the upper-frequency lobe in FIG. 2(a) and the lower-frequency lobe in FIG. 2(b)).

In the event that a microprocessor is used to perform the functions of the circuits within the dashed outline 99 in FIG. 1, and in particular the function of the pulse generator 57 (as described in French Patent Application No. 79 03 357), the microprocessor can be programmed to implement the change in reference signal frequency.

In the system described in that specification, a microprocessor (MPU) is arranged, under the control of a program of instructions stored in a read-only memory (ROM), to load a counter with a predetermined number stored either in the ROM or in random-access memory (RAM). The MPU then continues implementing other parts of the program, while the counter counts down from that number in response to pulses for a clock. When the counter reaches zero, it interrupts the execution of the main program, whereupon the MPU supplies a signal to a latched output terminal and reloads the counter. The signal is derived from one of a group of storage locations in the RAM which are addressed cyclically. Thus the output terminal supplies a cyclic signal whose waveform depends on the values in those storage locations and whose frequency depends, in part, on the magnitude of the predetermined number loaded into the counter. This cyclic signal is equivalent to the output of the pulse generator 57 and is supplied to the mixer 52. The sequence of MPU operations is illustrated in FIG. 4.

Figure 4:
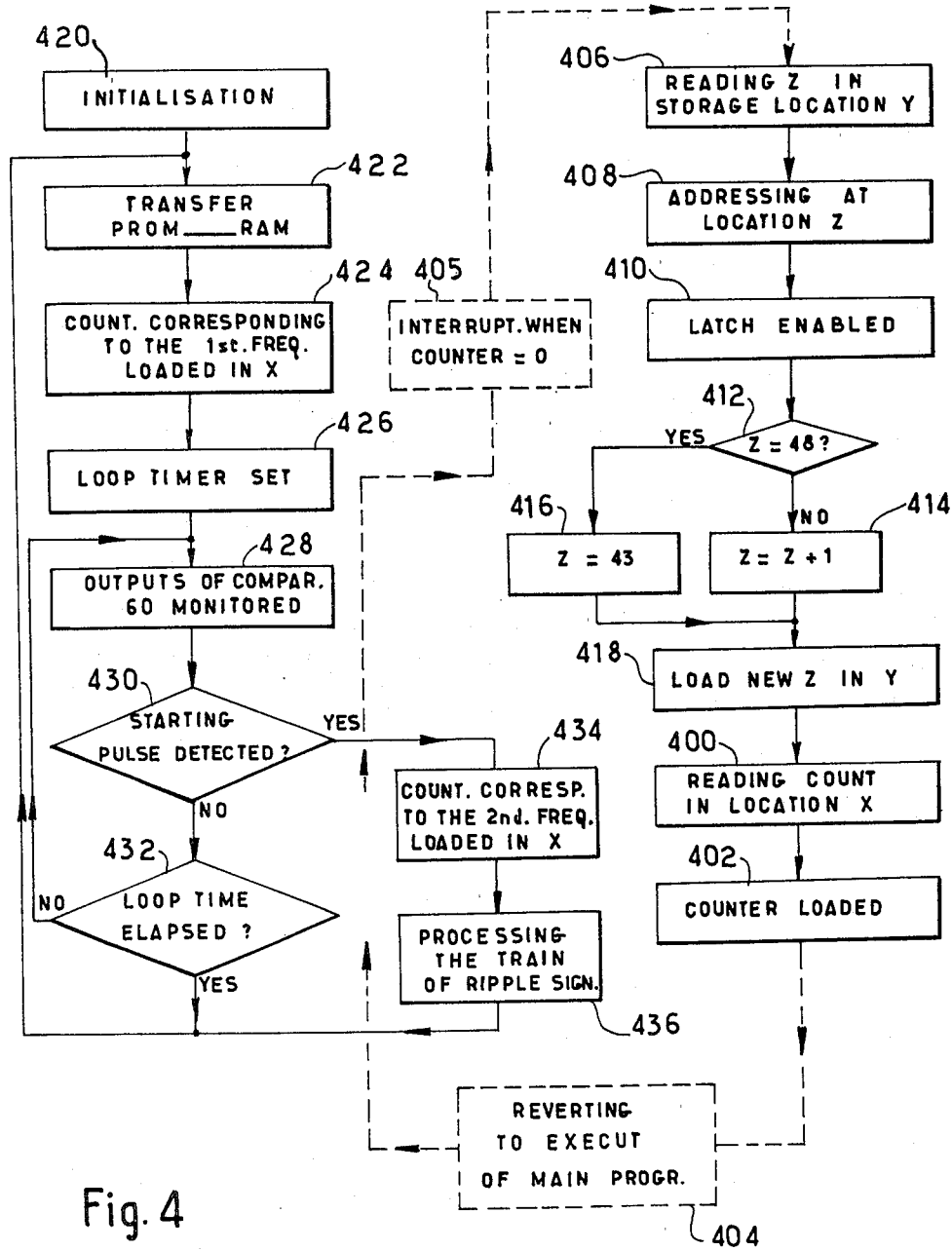
FIG. 4 is a flow diagram of part of the operation of a microprocessor in another form of the relay of FIG. 1.

Referring to FIG. 4, when an interrupt signal is received by the MPU from the counter, as illustrated at 405, the MPU addresses a storage location Y in the RAM (see FIG. 5) to obtain the current value (between 43 and 48) of a variable Z, at step 406. At the next step, 408, the RAM is addressed at location Z, and the value stored in that location is supplied to the latched output terminal. After the latch has been enabled at step 410 to retain that value, the MPU tests, at step 412, whether the maximum value of Z (48) has been reached. Depending on the outcome of this test, Z is either incremented by one (step 414) or reset to 43 (step 416), and the new value of Z stored in location Y (step 418). The predetermined number, or count, which is held in location X, is now extracted at step 400 and supplied to the counter at step 402, after which the MPU reverts to execution of the main program, as indicated at 404, until the next interrupt from the counter triggers a repetition of this sequence.

FIG. 4 also shows in outline the overall sequence of operations of the microprocessor, including the shifting of the frequency of the reference signal. Thus, when the relay is first supplied (or, after a power failure, re-supplied) with power the MPU executes an initialisation routine 420 to ensure that various registers etc. contain correct, predetermined values. The basic program of instructions controlling operation of the MPU is held permanently in a read-only memory (ROM), but, to permit use of the same relay design in different systems, certain parameters relating to the operation of the relay (such as the composition of the pulse train, the ripple frequency and the type of preselection), as well as the control-signal pulse position corresponding to each sense of operation of each relay unit, are stored in a programmable read-only memory (PROM). Thus, the relay can be adapted for any particular system, and the desired pulse-position codes set, merely by the addition of a PROM containing the parameter values appropriate to that system and the required codes. These values and codes are transferred to the RAM for use at step 422. In particular, the location X in the RAM is loaded with the value for the count appropriate to a reference signal frequency of 173 Hz, and this value is also loaded into the counter to start generation of the reference signal, at step 424. A loop timer is set at step 426, after which the MPU monitors (at step 428) the outputs of the dual comparator 60 for the correct sequence of signals indicative, as explained in U.S. Pat. No. 4,232,298, of a burst of 175 Hz ripple on the mains network. If no ripple representative of a starting pulse is detected, as determined by a test at 430, the MPU progresses to step 432, where it checks whether the loop timer set at step 426 indicates that the loop time has elapsed. If not, the program repeats the loop, starting at step 428, to check again for a starting pulse. If the loop time has elapsed the MPU returns to step 422 to re-load the contents of the PROM into the RAM as a precaution against the possibility of corruption of the data involved by electrical interference. While the MPU is repeating the loop 428 to 432, it is periodically interrupted by the counter to execute the sequence of instructions starting at 406 to sustain the reference signal, at a frequency of 173 Hz.

When a starting pulse is received, the test at step 430 re-directs the program to step 434, where the location X is loaded with a new number appropriate to a reference signal frequency of 177 Hz. The MPU then proceeds, as shown generally by step 436, with the processing of the train of ripple signals following the starting pulse. This processing involves: the monitoring of the outputs of the dual comparator 60, both at the time of possible occurrence of command pulses to detect and verify the duration of such pulses, and during the intervening periods to guard against spurious signals; the decoding, in accordance with position in the pulse train, of such command pulses as are received; and the appropriate operation of the relay units 42 to implement the decoded commands. Throughout this processing, the operation of the MPU continues to be interrupted by the counter to maintain the reference signal, now at a frequency of 177 Hz on account of the modified count contained in location X in the RAM.

After the complete pulse train has been received, the MPU returns to execution of the loop 422 to 432, to await another pulse train, and thus restores the count in location X to its initial value, for a reference signal frequency of 173 Hz.

In the arrangement described in U.S. Pat. No. 4,232,298, and summarised earlier, any control signal which is received and decoded is immediately implemented by the relay(s) to which it is directed. However, if a microprocessor is implementing the functions of the circuits within the box 99 in FIG. 1, other modes of operation can be realised. The sequence of microprocessor operations is outlined in the flow diagram shown in FIG. 6.

Figure 6:
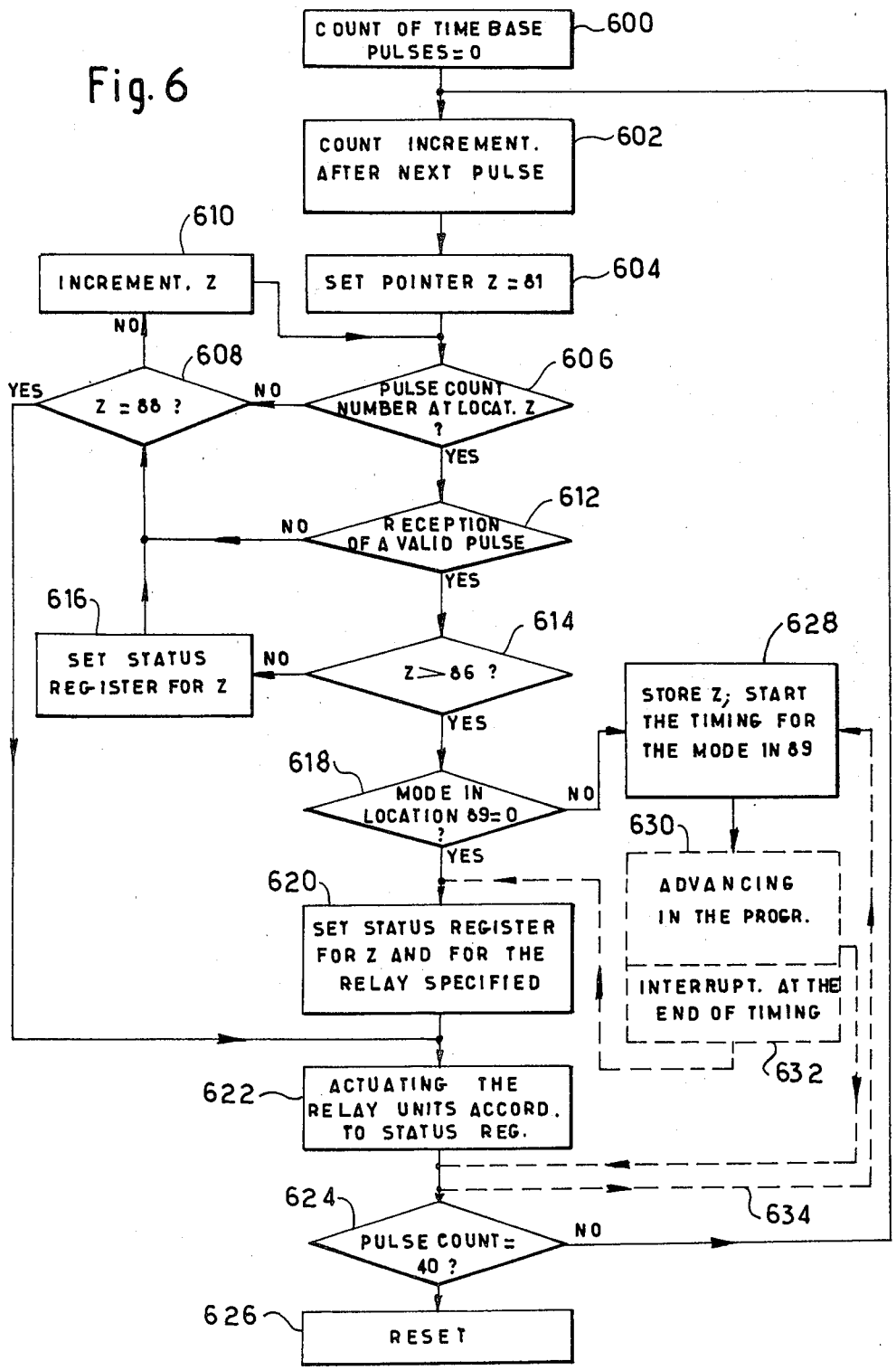
FIG. 6 is a flow diagram of another part of the operation of the microprocessor.

Referring to FIG. 6, it is assumed that the relay has detected the starting pulse of a train of control-signal pulses (for example, at step 430 in FIG. 4). Thereupon, a counter for counting timebase pulses (and thus for counting possible control-signal pulse positions) is zeroed at step 600, and then incremented at step 602 to an initial value of 1) by the first timebase pulse. A pointer Z is set to 81 at step 604, and then the contents of the RAM location having the address Z (initially 81—See FIG. 7) are examined at step 606. The RAM locations 81 to 88 each contain a respective number between 1 and 40, indicating one of the command-pulse positions in the pulse train. Step 606 involves the comparison of this number with the current pulse position count. If these two numbers are not equal, indicating that the command stored at address Z does not correspond to the current pulse-position count, the system proceeds to step 608 to test whether Z has reached a maximum value of 88. If Z has not reached 88, it is incremented at step 610 to test whether the current pulse-position count corresponds to the command stored in the next RAM location.

When such a correspondence is found, the system advances to step 612 to determine whether a valid ripple signal has been detected at the relevant pulse position. As noted earlier, this step 612 involves testing the occurrence and timing of signals from the dual comparator 60 (FIG. 1). If no pulse has been received, the procedure merely returns to step 608; if a pulse has been received, the current value of Z is checked at step 614.

For a value of Z of 81 to 86, the procedure progresses to step 616, at which a selected storage location in a 6-bit status register (FIG. 8) is set. The location is selected in accordance with the current value of the RAM address pointer Z. Thus, for example, if RAM location 83 contains 25, indicating that a pulse at position 25 in the pulse train commands the opening of relay unit 2 (FIG. 7), and a valid command pulse is received when the pulse-position count is 25, the tests at steps 606, 612 and 614 would yield results yes, yes and no respectively for Z=83. Consequently, the third status register bit would be set (see FIGS. 7 and 8). Thereafter, the system returns to step 608.

For a value of Z of 87 or 88, the test at step 614 causes the procedure to progress to step 618, where RAM location 89 is examined. This location contains three items of data: the identity of the relay unit to which an alternative mode of operation (described below) may apply; a code indicating which mode is required and the value of a constant n. If the mode code is 0, indicating that only conventional immediate implementation of received commands is required (in which case the counts at locations 87 and 88 merely supplement those at locations 81 to 86), the procedure continues to step 620, where a selected storage location in the status register is set. As at step 616, the location is selected in accordance with the current value of Z; but in addition, the identity of the relay specified at location 89 must be taken into account (see FIGS. 7 and 8).

When the test at step 608 indicates that Z has reached 88 or after the procedure has executed step 620, the procedure advances to step 622 to implement any command received for the current pulse-position count. To this end, the contents of the six locations of the status register are examined in turn to control the supply of actuating signals to the input terminals of the (in this case) three relay units in the relay circuit 42 of FIG. 1 to effect the commands received. Thus, continuing the example given earlier, the command pulse at position 25 causes the third status register location to be set. When this location is checked, it results in an actuating signal being supplied to the 'open-relay' input terminal of relay unit 2 at step 622, whereupon relay unit 2 is opened in accordance with the received command. Depending upon the detailed design of the relay units, which may for example incorporate thyristors or triacs, this step 622 may also involve monitoring of the network voltage to permit actuating signals to be appropriately synchronised with positive and/or negative-going half-cycles of the network voltage waveform.

After the relay units have been appropriately actuated, the procedure continues to step 624, where the current pulse position count is tested. If it has not reached 40, the procedure returns to step 602 to increment the pulse-position count in response to the next timebase pulse. However, when the contents of each RAM location 81 to 88 have been compared with every possible pulse-position count up to 40, the test at step 624 indicates that the final count of 40 has been reached, and that processing of the pulse train (step 436 in FIG. 4) is completed, whereupon the procedure resets the system to its quiescent condition, at step 626, to await another pulse train.

If the mode code stored in RAM location 89 and tested at step 618 is not 0, then another mode of command implementation is required, for which the procedure moves from step 618 to step 628 instead of step 620.

One advantageous mode of operation involves delaying implementation of a received command until a predetermined time $nT_1$ after receipt of the command, where n is the constant stored in RAM location 89 and $T_1$ is a predetermined unit time interval (see FIG. 9a). If desired, the implementation of the command can be temporary, being effected for the duration of a period $T_1$ starting at a time $nT_1$ after receipt of the command (FIG. 9b). By specifying an additional interval $T_2$, it is possible to make this temporary implementation recur, after successive times $T_2$, for further peiods $T_1$ (FIG. 9c).

To this end, the RAM includes a further location (FIG. 7) which is utilised if the procedure reaches step 628: this location 90 holds the values $T_1$ and $T_2$ respectively.

Thus, at step 628, the procedure first saves the current value of Z, examines the locations 89 and 90, and then starts a timing function, in accordance with known techniques and depending upon the values of n and $T_1$ stored in the locations 89 and 90, before advancing, as indicated at 630, to step 624. However, when the required time interval has elapsed, an interrupt signal is generated, and the procedure diverts as indicated at 632, back to step 620, where the operation depends on the mode specified in location 89. For simple delayed implementation (FIG. 9a), the appropriate one of the status register locations would be set, in accordance with the relay unit identified at RAM location 89 and depending on the value of Z stored at step 628; thereafter, at step 622, the status register would be used to control the application of an actuating signal to the appropriate relay unit input terminal to implement the command. In the case of delayed temporary implementation (FIG. 9b), the same action would be taken, but the timing function would also be re-started for a time $T_1$, as indicated by dashed line 634. After this additional time, the complementary status register location for the same relay unit would be set to return that relay unit to its original state. This would also occur for delayed repetitive temporary implementation (FIG. 9c), and the timing function would again be re-started, now for a time $T_2$, after which the sequence given above would be repeated. It is to be understood that during the timing of the intervals $T_1$, $nT_1$ and $T_2$, as appropriate, the system would be monitoring the power distribution network for further pulse trains, as described above in relation to FIG. 4, and would jump to step 620 as and when an interrupt signal occurred at the end of each time interval.

An advantage of delaying implementation of commands is that, by setting n to different values in different parts of the network, changes in power demand can be maintained within manageable limits. Thus, simple delayed implementation (FIG. 9a) permits an increase in load to be made progressive (FIG. 9d) while delayed temporary implementation, whether or not repetitive (FIGS. 9b and 9c), enables the increase to be limited to the power required for any one group of relays having the same value of n (FIG. 9e).

It is to be understood that although the relay unit indicated at RAM location 89 may be involved in delayed implementation of an appropriately-coded command transmitted in one control-signal pulse train, that same relay unit can subsequently provide immediate implementation of a command coded in accordance with the counts stored in the relevant ones of RAM locations 81 to 86. Furthermore, the incorporation of preselection (omitted from the above description for clarity) permits additional scope in the permutations of commands available.

We claim:

1. A remotely-controllable relay for effecting an operation in response to a control signal in the form of an alternating ripple voltage superimposed upon an alternating power supply voltage in an electric-power distribution network, comprising:
   means arranged to store predetermined parameters of said operation and said control signal, said parameters including an indication of a preselected period of delay required between reception of said control signal and occurrence of said operation, the value of a predetermined constant, and the value of a predetermined unit time interval, said period of delay being equal to the product of said constant and said unit time interval;
   means responsive to said storage means and coupled to said network to detect the transmission of a control signal conforming to said stored predetermined parameters relating thereto;
   means responsive to said detection means and said storage means and arranged to determine when said period of delay has elapsed following said transmission; and
   means responsive to said delay determining means and said storage means and arranged to effect said operation in accordance with said stored predetermined parameters relating thereto.

2. A relay according to claim 1, wherein said storage means is further arranged to store predetermined parameters of two control signals for said operation, only one of which has an associated delay period.

3. A relay according to claim 1, wherein said storage means is arranged to store an indication of a second preselected period of delay, said delay determining means is further arranged to determine when said second period of delay has elapsed following said operation, and said operation-effecting means is further arranged to effect the inverse of said operation when said delay determining means determines the end of said second period of delay.

4. A relay according to claim 3, wherein said storage means is further arranged to store an indication of an additional preselected period of delay, said delay determining means is further arranged to determine when said additional period of delay has elapsed following said inverse of said operation, and said operation-effecting means is further arranged to repeat said operation when said delay determining means determines the end of said additional period of delay.

5. A relay according to claim 1, wherein said storage means is further arranged to store an indication of whether or not delayed operation is required.

6. A method of effecting an operation in response to a control signal in the form of an alternating ripple voltage superimposed upon an alternating power supply voltage in an electric-power distribution network, comprising the steps of:
   storing predetermined parameters of said operation and said control signal, said parameters including an indication of a preselected period of delay required between reception of said control signal and occurrence of said operation, the value of a predetermined constant and the value of a predetermined unit time interval, said period of delay being equal to the product of said constant and said unit time interval;
   detecting the transmission of a control signal conforming to said stored predetermined parameters relating thereto;
   determining when said period of delay has elapsed following said transmission; and thereupon
   effecting said operation in accordance with said stored predetermined parameters relating thereto.

7. A method according to claim 6, including storing predetermined parameters of two control signals for said operation, only one of which has an associated delay period.

8. A method according to claim 6, including storing an indication of a second preselected period of delay, determining when said second period of delay has elapsed following said operation, and thereupon effecting the inverse of said operation.

9. A method according to claim 8, including storing an indication of an additional preselected period of delay, determining when said additional period of delay has elapsed following said inverse of said operation, and thereupon repeating said operation.

10. A method according to claim 6, including storing an indication of whether or not delayed operation is required.

* * * * *